T. M. PROVINCE.
BOLT SHEARING TOOL.
APPLICATION FILED MAR. 20, 1920.
1,354,843.
Patented Oct. 5, 1920.
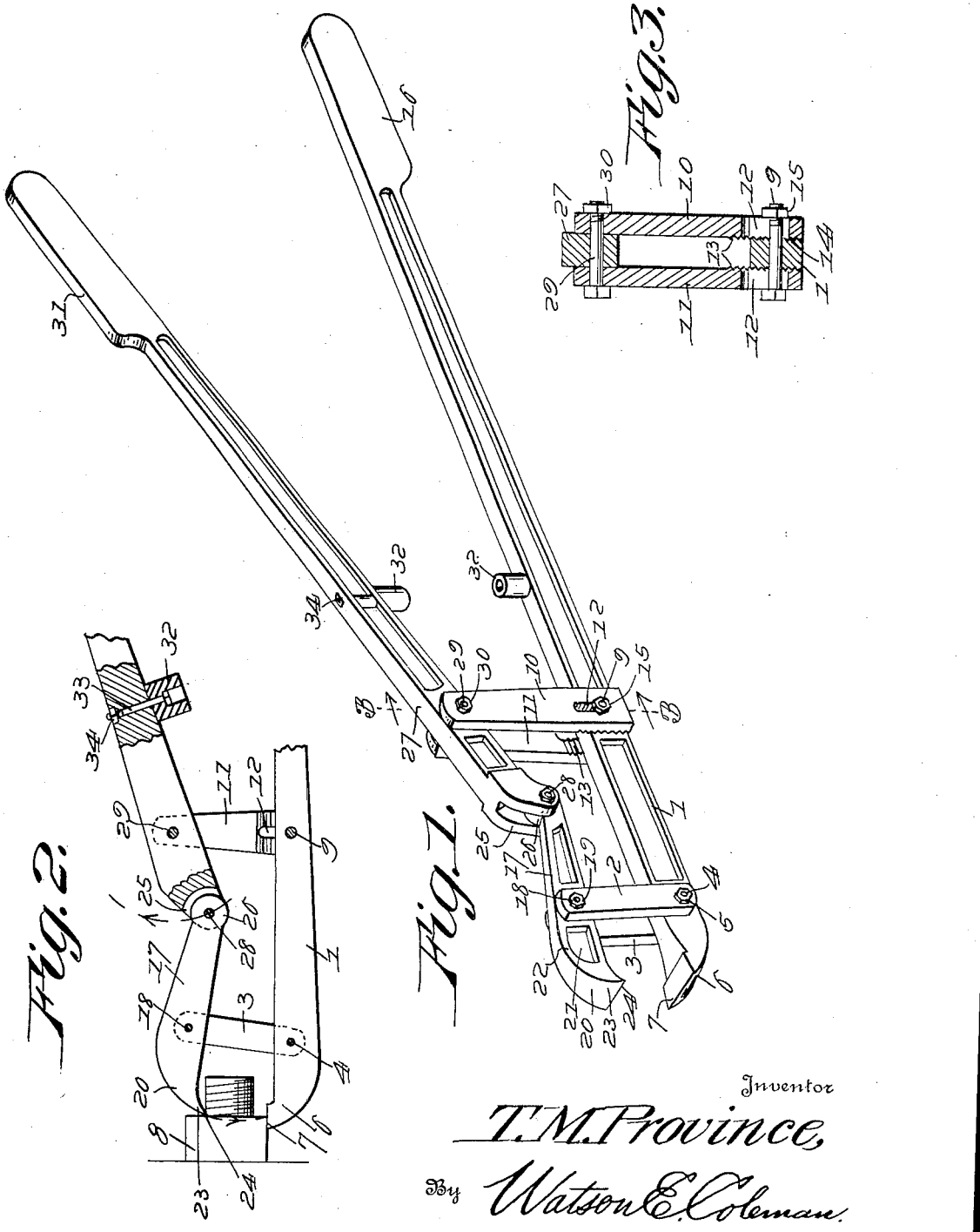

UNITED STATES PATENT OFFICE.

THOMAS M. PROVINCE, OF DENVER, COLORADO.

BOLT-SHEARING TOOL.

1,354,843.   Specification of Letters Patent.   Patented Oct. 5, 1920.

Application filed March 20, 1920. Serial No. 367,385.

*To all whom it may concern:*

Be it known that I, THOMAS M. PROVINCE, a citizen of the United States, residing at Denver, in the city and county of Denver and State of Colorado, have invented certain new and useful Improvements in Bolt-Shearing Tools, of which the following is a specification, reference being had to the accompanying drawings.

This invention relates to an improved bolt shearing tool, which is efficient and practical in use.

Tools of this character heretofore produced, leave a ragged or wire edge on the bolt after it is cut, thereby necessitating filing, or otherwise smoothing the bolt off, particularly when it is the aim to paint the ends of the bolts and nuts. Furthermore, with heretofore used tools of this kind, the operator is unable to shear or cut the bolt close to the nut, thereby also requiring the filing off of the end of the bolt.

This invention aims primarily to provide a tool, by which the end of the bolt may be cut very close to the nut, in fact flush with the nut, in order to leave a smooth surface obviating a ragged or wire edge on the bolt, and also will leave no sharp corners.

A further object is to provide a tool of this kind including an anvil or dolly on one end of one of the jaws of the tool adapted to be engaged under the nut, with which the shearing or cutting jaw coöperates, in order to shear the bolt smooth and flush with the surface of the nut.

Furthermore, the present invention aims to form the anvil or dolly so as to protrude beyond the shearing or cutting jaw, so that the surface which emerges from the cutting edge of the cutting jaw will lie closely adjacent the face of the nut, with the cutting edge directly in contact with the nut, whereby as the cutting jaw is caused to be moved, the cutting edge will move across the face of the nut, and shear or cut the bolt smooth and flush therewith.

A further object of the invention is to provide a device of this kind which comprises but few parts, and can be cheaply made and is also capable of being sold at a reasonable profit.

A still further object is to provide a tool wherein but one piece of tool steel is required, and this character of metal is used to form the cutting or shearing jaw, whereas the other jaw which carries the anvil or dolly and engages under or with one side of the nut, and merely acts as an abutment for the cutting jaw as it completes its shearing action on the bolt, and therefore may be made of less expensive metal.

An additional object of the invention is to provide a tool including opposing and co-operating parts, so connected and operated with relation to each other as to enable the cutter or shearing tool to have a forward motion as the moving handle is pulled toward the opposing handle, thereby keeping the shearing or cutting jaw continually in contact with the face of the nut, to insure shearing the bolt smooth and flush with the face of the nut.

Also the invention aims to provide certain of the parts of the shearing tool with means for taking up the wear and at the same time to insure holding one of the handles rigid, while the opposite handle is capable of a slight pivotal movement, so as to insure it having the aforesaid forward movement.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a perspective view of the improved bolt shearing tool constructed in accordance with the invention, showing the opposing jaws in open positions.

Fig. 2 is a view in side elevation showing the plate 10 removed and showing parts of the handle element 27 broken away so as to show the connection of the bumper 32 and the pivot 28.

Fig. 3 is a cross sectional view on line 3—3 of Fig. 1.

Referring to these drawings, 1 designates a rigid member of the tool. Opposing plates 2 and 3 are disposed to engage opposite sides of the member 1, there being a suitable bolt 4 passing through these plates and through the member 1, and it is provided with a nut 5 for holding the plates in position. The member 1 beyond the plates 2 and 3 terminate in a jaw 6 which may be any suitable shape in cross section and is provided with an anvil or dolly 7. The dolly or anvil 7 is adapted to engage one edge or one face of a nut 8, when a cutting or shearing tool is in the act of shearing or cutting across a bolt.

The member 1 also beyond the plates 2 and 3, but in an opposite direction, is channeled out on its opposite sides as shown, and has ribs as indicated, the channeled out portions acting to lighten the member, whereas the ribs act to strengthen the member.

A bolt 9 passes through the member 1 at a suitable spaced distance from the bolt 4 and also passes through the opposing plates 10 and 11. These plates 10 and 11 where the bolt 9 passes through them are provided with elongated slots 12, so as to permit the member 1 to be adjusted relatively to the plates 10 and 11, and when the member 1 is adjusted, the bolt is likewise adjusted.

The adjacent faces of the plates 10 and 11 are provided with a plurality of notches or serrations 13, which coöperate with interfitting serrations or notches 14 of the edges of the ribs of the member 1, in order to take up the wear. The bolt 9 has a head at one end and threaded to its opposite end is a nut 15 for clamping the plates in position so that the serrations or notches will interengage, and thereby hold the plates rigid with relation to the member 1 and vice versa. The member 1 beyond the plates 10 and 11 in a direction from the plates 2 and 3 terminates in a handle 16, adapted to be grasped by an operator when shearing a bolt.

A second tool member 17 is pivotally mounted upon a bolt 18, which passes through the plates 2 and 3 and has a nut 19, and this tool member at one end in a position opposing the anvil or dolly terminates in a jaw 20. This jaw 20 is designed to be constructed preferably of tool steel and has its opposite faces hollowed out as at 21 to lighten the jaw. The ribs or flanges 22 caused to be formed by hollowing out the jaw act to strengthen and reinforce the jaw. The jaw 20 has a projecting part 23, which is provided with a cutting edge 24, directly in an opposed position to the face of the anvil or dolly, in order to coöperate therewith during its movement across the face of the nut and through the bolt. Owing to the opposing plates 2 and 3 being pivoted to the member 1 and since the anvil or dolly projects a short distance beyond the cutting edge of the jaw 20, the jaw 20 is allowed to have a forward movement during the entire time that the cutting edge is shearing or cutting across the bolt, thereby keeping the portion of the jaw immediately adjacent the cutting edge at all times in contact with the face of the nut. This insures cutting the bolt smooth and flush with the face of the nut, thereby not leaving any ragged or wire edge on the end of the bolt, and hence eliminating the necessity of using a file.

The member 17, beyond the plates 2 and 3 in an opposite direction to the jaw 20, is channeled out, and provided with marginal ribs to lighten and strengthen the member.

The end 26 of the part of the member 17 which projects in a direction from the jaw 20 is pivotally mounted in a bifurcation 25 of a handle element 27. A pivot bolt 28 passes through the forks caused to be formed by the bifurcation 25 and through the reduced extension 26, thereby pivotally uniting the member 17 and the handle element 27 allowing a pivotal action between the two members. The handle element is pivotally mounted upon a bolt 29, and engaged between the opposing plates 10 and 11, the bolt 29 passing through the plates and is provided with a nut 30. The handle element in a direction substantially parallel with the handle 16 terminates in a handle 31 which is in opposed relation to the handle 16. It will be noted that the handle 16 is a trifle longer than the handle 31. The opposing handles 16 and 31 are provided with rubber bumpers 32, which are secured to the handles by means of suitable bolts 33, which carry nuts 34. The heads of the bolts 33 are countersunk considerably in the bumper in order that the bolts will not contact when the bumpers come together during the action of the handles toward each other.

The invention having been set forth, what is claimed as new and useful is:

1. In a bolt shearing tool, the combination with a rigid jaw having an anvil at one end adapted to engage under one face of a nut, of an opposing member, opposing plates pivoted to the rigid jaw element and in turn pivotally connected to the opposing member, said opposing member having a shearing jaw adapted to engage a bolt and to coöperate with the anvil for shearing the bolt, and means connected to the jaw element and in turn pivotally connected to the opposing member for operating the same, said means of the jaw element terminating in gripping handles.

2. In a bolt shearing tool, the combination with an elongated element having an anvil at one end, of opposing plates pivoted to the opposite sides of the member, a second member in opposed position to the first member and pivotally mounted between the plates and having a jaw provided with a shearing edge at one end in opposed relation to the anvil, the anvil being adapted to engage one face of a nut and the cutting edge being adapted to engage a bolt, whereby upon movement of the jaw, the cutting edge will shear the bolt, and means connected to the first member in opposed relation thereto and in turn pivotally connected to the second member and adapted to impart a forward movement thereto to insure a close engagement with the cutting edge of the face of the nut, whereby the bolt may be cut smooth and flush with the face of the nut.

3. In a bolt shearing tool, the combination with an anvil member to engage one face of a nut, of a jaw in opposed relation to the anvil adapted to engage and shear the bolt, means for pivotally linking the jaw and the anvil member, supports rigidly and adjustably mounted on the anvil member, and a handle member in opposed relation to the anvil member and being pivotally mounted between the supports and in turn pivotally connected to the opposing jaw and adapted to impart a forward movement to said jaw to insure keeping the cutting edge in contact with the face of the nut, whereby the bolt may be sheared smooth and flush with the face of the nut.

4. In a bolt shearing tool, the combination with an anvil member to engage one face of a nut, of a jaw in opposed relation to the anvil adapted to engage and shear the bolt, means for pivotally linking the jaw and the anvil member, supports rigidly and adjustably mounted on the anvil member, and means pivoted between the supports and in turn pivotally connected to the jaw, to impart a pivotal and forward movement to the jaw for causing the same to shear the bolt and keeping the cutting edge in close contact with the face of the nut, whereby the bolt may be sheared smooth and flush with the face of the nut.

5. In a bolt shearing tool, the combination with an anvil member to engage one face of a nut, of a jaw in opposed relation to the anvil adapted to engage and shear the bolt, means for pivotally linking the jaw and the anvil member, supports rigidly and adjustably mounted on the anvil member, and means pivoted between the supports and in turn pivotally connected to the jaw, to impart a pivotal and forward movement to the jaw for causing the same to shear the bolt and keeping the cutting edge in close contact with the face of the nut, whereby the bolt may be sheared smooth and flush with the face of the nut, said anvil member and said means having opposed handles, said adjustable connections of the supports with the handle member comprising elongated slots in the supports, a bolt carried by the anvil member and passing through the slots, and coöperating serrations carried by the supports and anvil member to hold the supports rigid with relation to the anvil member.

In testimony whereof I hereunto affix my signature.

THOMAS M. PROVINCE.